United States Patent [19]

Schnettler et al.

[11] 3,856,854
[45] Dec. 24, 1974

[54] PROCESS OF PREPARING ALPHA-HYDROXYMETHYL AMINOACIDS

[76] Inventors: Richard A. Schnettler, 6234 W. Donges Ln., Brown Deer, Wis. 53223; John T. Suh, 3709 W. Scenic Dr., 11 N. Mequon, Wis. 53092

[22] Filed: Nov. 20, 1972

[21] Appl. No.: 307,947

[52] U.S. Cl.......... 260/519, 260/307 A, 260/534 M
[51] Int. Cl............................................ C07c 101/72
[58] Field of Search............ 260/519, 307 A, 534 M

[56] References Cited
UNITED STATES PATENTS
3,395,176   7/1968   Sletzinger et al................... 260/519

OTHER PUBLICATIONS
Stewart, Journal of Organic Chemistry, Vol. 26, pp. 3360 & 3361, (1961).

Primary Examiner—Lorraine A. Weinberger
Assistant Examiner—Patrick J. Hagan
Attorney, Agent, or Firm—T. F. Kryshak; M. L. Youngs

[57] ABSTRACT

α-Hydroxymethylated aminoacids are prepared by treating a naturally-occurring aminoacid with acetic anhydride in the presence of sodium acetate to form the corresponding azlactone which is reacted with paraformaldehyde to give an intermediate which is then hydrolyzed to form the desired α-hydroxymethylated aminoacid. Among the α-hydroxymethylated aminoacids which may be thus obtained are known compounds such as α-hydroxymethyl-3,4-dihydroxyphenylalanine.

3 Claims, No Drawings

PROCESS OF PREPARING ALPHA-HYDROXYMETHYL AMINOACIDS

SUMMARY OF THE INVENTION

The invention relates to a process of preparing α-hydroxymethyl derivatives of aminoacids. More particularly, it relates to a process of preparing compounds of the formula

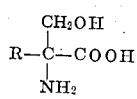

in which R is an amino acid moeity which is unchanged by the process such as an alkyl group, phenyl or a substituted phenyl, e.g., methoxy phenyl, hydroxyphenyl or halophenyl.

An advantage of the present invention is that it provides a two step process for hydroxymethylating naturally-occurring aminoacids, such as dihydroxyphenylalanine.

The process of the present invention comprises first treating the aminoacid to be α-hydroxymethylated with acetic anhydride and sodium acetate. The resulting mixture is then heated on a steam bath for about 2 hours, paraformaldehyde is added, and the reaction mixture is heated on the steam bath for about 4 to 6 hours. The reaction mixture is then cooled and diluted with water. The organic material is then extracted into a suitable solvent, such as chloroform, washed with water and the solvent removed by evaporation. The thus obtained acetylated aminoacid is hydrolyzed under acidic conditions to yield the desired α-hydroxymethylated aminoacid.

The process of the invention may be illustrated as follows:

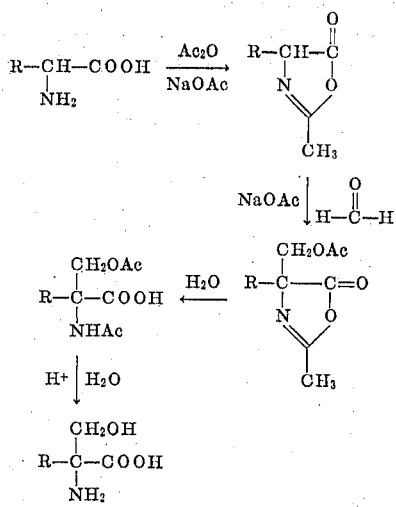

in which R is as previously defined.

Representative of the aminoacids which may be employed as starting materials are the following:
tyrosine,
3,4-dihydroxyphenylalanine,
phenylalanine,
4-chlorophenylalanine,
4-fluorophenylalanine, and
4-bromophenylalanine.

Representative of the α-hydroxylated aminoacids which may be prepared in the described process are the following:
α-hydroxymethyl tyrosine,
α-hydroxybenzylserine,
α-hydroxymethyl-3,4-dihydroxyphenylalanine,
α-hydroxymethyl-3,4-dichlorophenylalanine, and
α-hydroxymethyl-4-fluorophenylalanine.

The α-hydroxymethylated aminoacids which may be prepared by practice of the present invention may be used as chelating agents for heavy metal ions, especially ferric ions. In addition, they may be used as nutrient sources and depending upon their pharmacologic activity, as pharmaceutical agents.

The practice of the process of the invention is further illustrated by the following examples:

EXAMPLE 1

O,O,N-Triacetyl-p-hydroxybenzylserine

To 510 g. (5 moles) acetic anhydride is added 46 g. (0.56 mole) sodium acetate and 100 g. (0.55 mole) tyrosine. The mixture is stirred on the steambath for 2 hours, at which time 30 g. (1.0 mole) paraformaldehyde is added and the reaction mixture stirred for an additional 6 hours on the steambath, cooled, and diluted with 700 ml. water. The organic material is extracted into chloroform, washed with 2 liters water and without drying, the chloroform is evaporated. The orange oily residue is heated and stirred with 200 ml. water for 30 minutes and separated from the water with the aid of a small amount of chloroform. The chloroform is evaporated and the residue is dissolved in 200 ml. water and 200 ml. acetone and refluxed for 30 minutes and the acetone distilled. The residue is extracted into chloroform, washed with water and dried. On standing in chloroform, the product crystallized to give O,O,N-triacetyl-p-hydroxybenzylserine as a white solid which is recrystallized from methanol to give a purified product which has a melting point of 224°–226°.

Anal. Calcd. for $C_{16}H_{19}NO_7$: C, 56.96; H, 5.68; N, 4.15.

Found: C, 56.51; H, 5.66; N, 4.50.

EXAMPLE 2

O,O,O,N-Tetraacetyl-(3,4-dihydroxybenzyl)serine

To 162 g. (1.6 moles) acetic anhydride is added 8.2 g. (o.1 mole) sodium acetate, and 25.0 g. (0.127 mole) dihydroxyphenylalanine. The mixture is heated and stirred on a steambath for 2 hours, at which time 10.0 g. (0.33 mole) of paraformaldehyde is added and the mixture stirred and heated for an additional 5 hours, cooled, and stirred with 500 ml. water. The water is decanted from the oily residue and the process repeated three times. The residue is taken up in 50% aqueous acetone (500 ml.) and refluxed for 5 hours, the acetone distilled, the aqueous suspension extracted with ethyl acetate, washed with water, and dried. Removal of the solvent affords an oily residue which is crystallized from ethyl acetate to give O,O,O,N-tetraacetyl-(3,4-dihydroxybenzyl)serine as a white solid which is recrystallized from ethanol, m.p. 224°–225°.

Anal. Calcd. for $C_{18}H_{21}NO_9$: C, 54.68; H, 5.36; N, 3.55.

Found: C, 54.77; H, 5.52; N, 3.54.

EXAMPLE 3 p-Hydroxybenzylserine

To 20 ml. 6N hydrochloric acid solution is added 9.0 g. (o.0267 mole) O,O,N-triacetyl-p-hydroxybenzylserine. The solution is heated on a steambath under nitrogen for 1 hour and the water is removed by azeotropic distillation with toluene. A glassy residue is obtained which is dissolved in 50 ml. of water and is stirred with 20 g. Dowex 1-x-8. A precipitate forms which is decanted from the resin and collected on the filter. The white solid is recrystallized from water to give p-hydroxybenzylserine in the form of white crystals, m.p. 313°–314°.

Anal. Calcd. for $C_{10}H_{13}NO_4$: C, 56.86; H, 6.20; N, 6.63.
Found: C, 56.81; H, 6.25; N, 6.69.

EXAMPLE 4

α-Hydroxymethyl-3,4-dihydroxyphenylalanine

In 20 ml. of 6N hydrochloric acid is placed 3.1 g. (0.00785 mole) O,O,O,N-tetraacetyl-3,4-dihydroxybenzylserine. The mixture is heated on a steambath under nitrogen for 2.5 hours, after which a homogeneous straw-colored solution is obtained. The water is distilled with toluene under nitrogen, and the glassy residue washed twice with a small amount of ether and dissolved in 10 ml. water. The slightly pink solution is stirred with Dowex 1-x-8 for one hour, at which time a slight precipitate forms and the solution is filtered. The water is removed with toluene to obtain α-hydroxymethyl-3,4-dihydroxyphenylalanine as a tan powder, m.p. 295°.

Anal. Calcd. for $C_{10}H_{13}NO_5$: C, 52.86; H, 5.77; N, 6.16.
Found: C, 53.15; H, 6.13; N, 6.04.

We claim:

1. A method of preparing α-hydroxymethylated amino acids of the formula

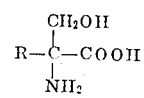

in which R is an aminoacid residue selected from an alkyl group, phenyl, methoxyphenyl, dimethoxyphenyl, hydroxyphenyl, dihydroxyphenyl or halophenyl, which comprises reacting an aminoacid of the formula

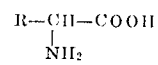

with acetic anhydride in the presence of sodium acetate to form an azalactone of the formula

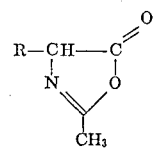

heating the resulting mixture on a steam bath and adding paraformaldehyde, then maintaining the mixture on a steam bath for about 4 to 6 hours to form the acetylated aminoacid and finally hydrolyzing that compound under acidic conditions to obtain the α-hydroxymethylated aminoacid of formula I.

2. The method of claim 1 in which R is dihydroxyphenyl.

3. The method of claim 1 in which R is hydroxyphenyl.

* * * * *